Nov. 6, 1956     C. L. BROWNLOW     2,769,868
LINE FAULT DETECTOR

Filed Feb. 18, 1952     3 Sheets-Sheet 1

FIG. I.

INVENTOR.
CECIL L. BROWNLOW
BY
*Hudson & Young*
ATTORNEYS

Nov. 6, 1956

C. L. BROWNLOW 2,769,868

LINE FAULT DETECTOR

Filed Feb. 18, 1952

INVENTOR.
CECIL L. BROWNLOW

BY *Hudson & Young*

ATTORNEYS

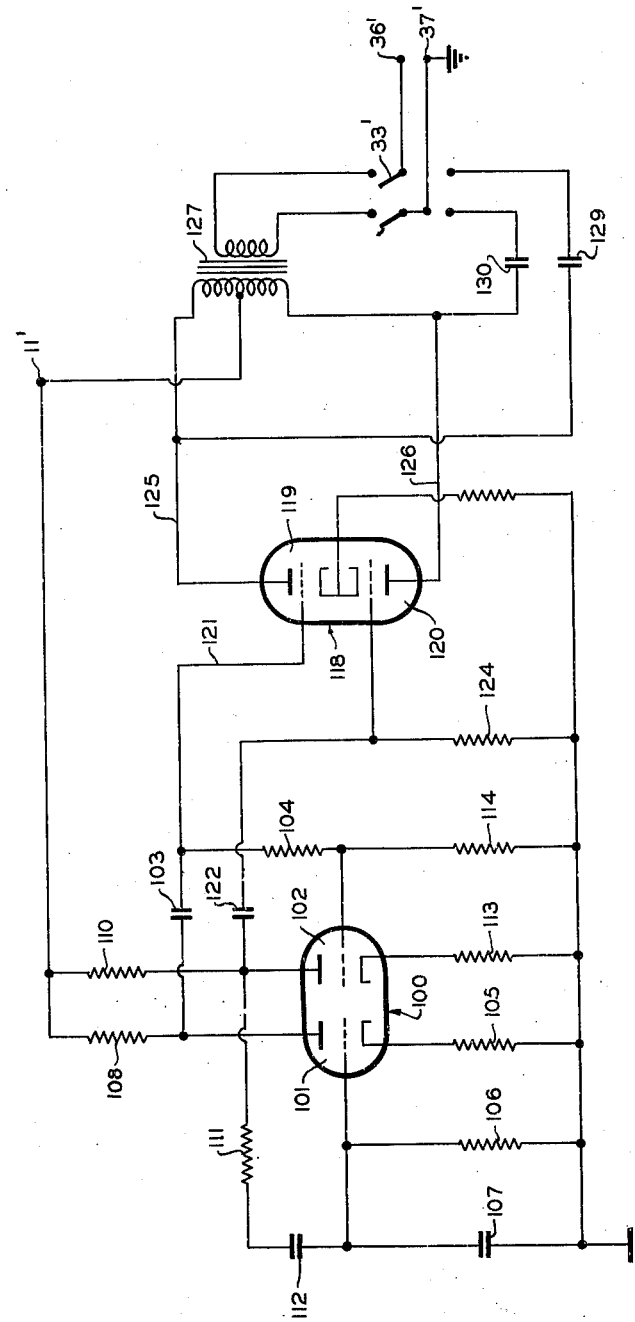

United States Patent Office 2,769,868
Patented Nov. 6, 1956

2,769,868

LINE FAULT DETECTOR

Cecil L. Brownlow, Bartlesville, Okla., assignor to Phillips Petroleum Company, a corporation of Delaware Application February 18, 1952, Serial No. 272,034

1 Claim. (Cl. 179—171)

This invention relates to a method of locating a fault in a multi-conductor cable. In another aspect, it relates to a transmitter for producing an electric field around the cable of such nature that the location of the fault may be readily determined.

This application is a continuation-in-part of my co-pending application Serial No. 53,925, filed October 11, 1948, now Patent No. 2,586,781 entitled Line Fault Detector.

Heretofore, various attempts and proposals have been made relating to methods and apparatus for determining the location of a short or open circuit in a faulted conductor. Such systems ordinarily utilize at least three of the cable conductors for the purpose of producing a field about the cable of such nature that the location of the fault can be determined. These systems are sometimes critical in operation due to variations in spacing between the conductors and it is necessary to use switching apparatus operated at a high rate of speed in order that the fault location may be identified. Such switching arrangements require frequent adjustment and are difficult to operate reliably under conditions encountered in the field.

I have discovered a simple and inexpensive method of locating a fault in a conductor in which all conductors of the cable are grounded with the exception of the faulted conductor. In carrying out my method, the faulted conductor is located by known methods and it is also determined whether the fault consists of a short or open circuit. In the former case, I pass a heavy current through the faulted conductor and determine the location of the short circuit by measurement of the inductive field about the conductor. In the latter case, I apply a relatively high voltage between the open circuited conductor and ground, the location of the open circuit being determined by measurement of the electrostatic field about the cable. In carrying out this method, I utilize a transmitter particularly adapted for producing the aforesaid inductive and electrostatic fields together with a probe of novel construction for measuring the field about the cable.

It is an object of the invention to provide an improved method of locating a fault in a multi-conductor cable.

It is a still further object of the invention to provide a transmitter for producing either an electromagnetic or electrostatic field about the cable, there being an abrupt variation in field intensity at the fault location.

It is a still further object of the invention to provide apparatus which is reliable in operation, rugged in construction, and which is economical to build and manufacture.

Various other objects, advantages and features of the invention will become apparent from the following detailed description taken in conjunction with the accompanying drawings, in which:

Figure 7 is a modified transmitter circuit.

Figure 1:
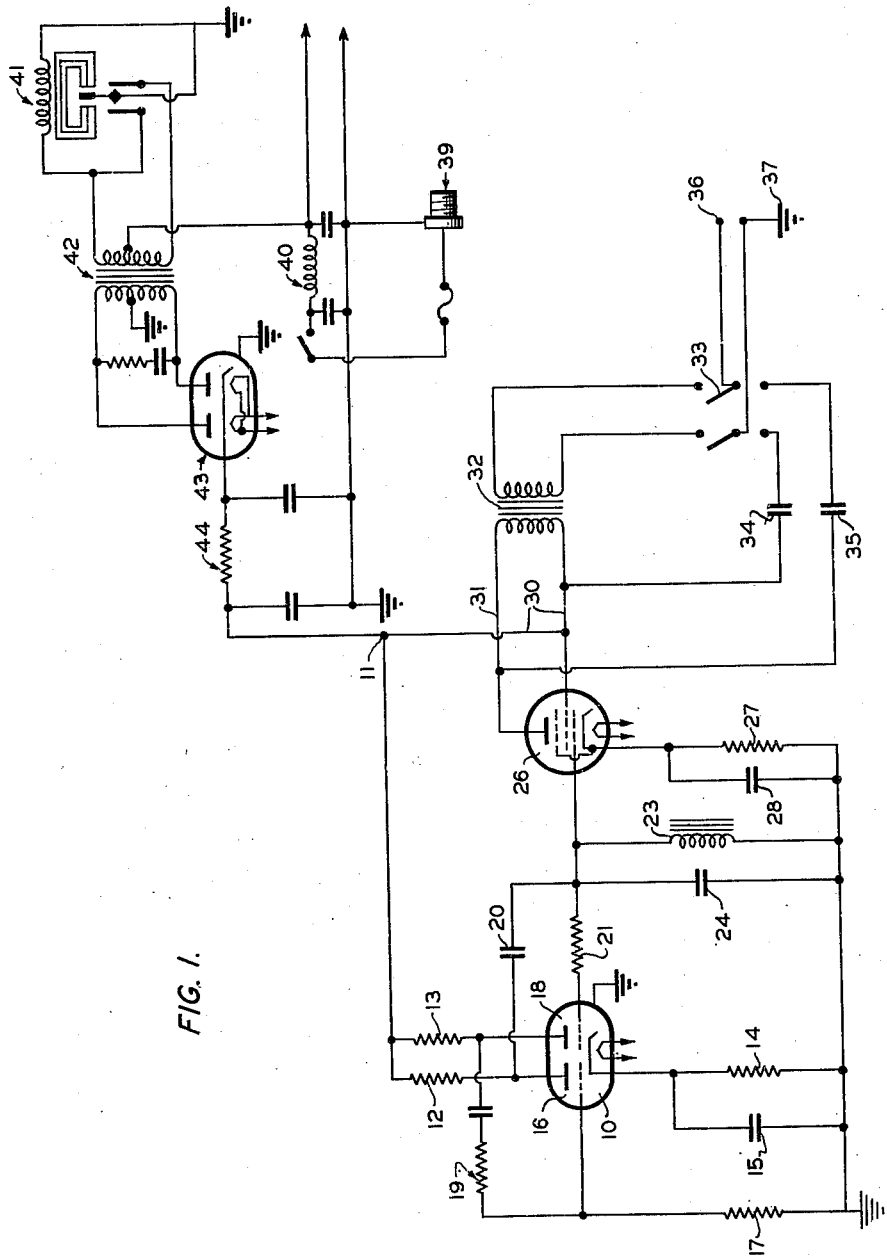
Figure 1 is a schematic circuit diagram of the transmitter circuit.

Referring now to the drawings in detail, and particularly to Figure 1, I have shown a transmitter circuit for producing an electric current which may have a frequency of about 1,000 cycles per second, or any other suitable frequency in the audio range. The pulses are produced by an oscillator circuit including a dual triode 10 having its anodes connected to a positive power supply terminal 11 through resistors 12 and 13, respectively. The common cathode of the tubes is connected through a resistor 14 to ground and this resistor is shunted by a condenser 15. The control grid of triode section 16 is connected to ground through a resistor 17 and to the anode of triode section 18 through a resistance-capacitance unit 19 while the anode of section 16 is connected through a condenser 20 and a resistor 21 to the control grid of section 18. The circuits are such that triode sections 16, 18 are alternately conductive, the flow of anode current through each triode section producing the voltage pulse to initiate operation of the other triode section after a suitable time delay determined by the time constants of resistance-capacitance units 19 and 20, 21. The frequency of the oscillator is determined by a resonant circuit consisting of a choke or inductance 23 shunted by a condenser 24, this circuit being connected between ground and the junction of condenser 20 with resistor 21. The oscillator has been found to produce a very stable output having a generally sinusoidal wave form.

The output of the oscillator is fed to the control grid of a tube 26 which is preferably but not necessarily a pentode. The suppressor grid of the tube is connected to the cathode thereof which is grounded through a resistor 27 shunted by a condenser 28. The screen grid of the tube is connected to positive supply terminal 11 by a lead 30 while the anode of the tube is connected by a wire 31 to one primary terminal of the output transformer 32, the other primary terminal being connected by lead 30 to positive power supply terminal 11.

The secondary winding of the transformer 32 is connected to one set of terminals of a double pole double throw switch 33 and the other set of switch terminals is connected through condensers 34 and 35, respectively, to the conductors 30 and 31. The blades of switch 33 are connected, respectively, to output terminals 36 and 37, the latter terminal being provided with a ground connection.

The power supply unit is of a type well adapted for portable work and includes an input plug 39, an input filter 40, a vibratory interrupter 41, a power transformer 42, a rectifier 43, and an output filter 44, this unit supplying filtered direct current of low voltage to the heaters of tubes 10, 26 and a positive anode voltage to the power supply terminal 11.

The generally sinusoidal alternating voltage produced by the oscillator is amplified by pentode 26 and fed to output terminals 36 and 37. With switch 33 in its upper position, a heavy current is obtained from transformer 32 and the secondary winding of the transformer provides an inductive load substantially matching the impedance of the conductor in which the fault is to be located. With switch 33 in its lower position, a smaller current is obtained at relatively high voltage and the condensers 34, 35 provide capacitive coupling substantially matching the capacitance of the conductor in which the fault is to be located.

Figure 2:
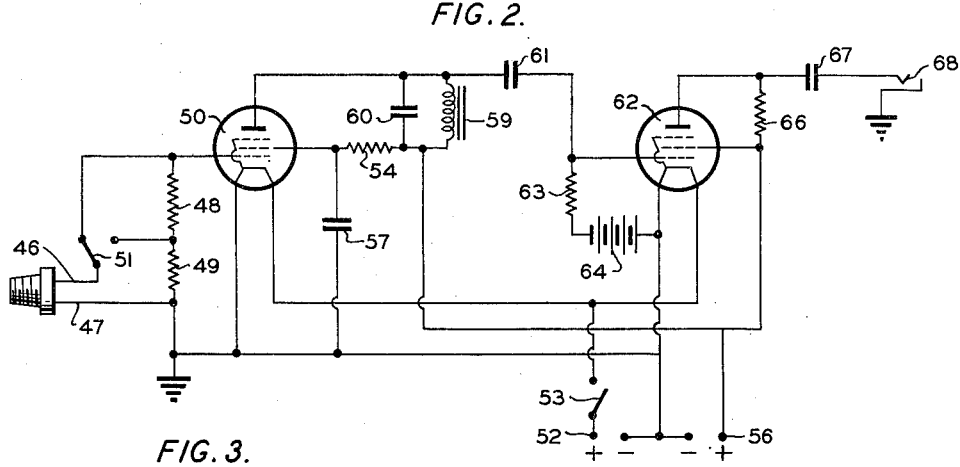
Figure 2 is a schematic circuit diagram of the receiver circuit.

The receiver is illustrated in Figure 2 and comprises input terminals 46, 47 to which is fed the output of a capacitive or inductive probe. In operation, the probe is moved along the cable and it is responsive, depending on its construction, to either the electromagnetic or electrostatic field surrounding the cable. Grid resistances 48, 49 are connected in series between the control grid of a pentode 50 and ground and the signal from terminals 46, 47 is fed to the grid of tube 50 through a switch 51 which selectively connects terminal 46 either directly to the control grid, or to the junction between resistors 48 and 49. Accordingly, switch 51 is effective to vary the gain or sensitivity of the receiver.

Tube 50 is of the filament type and has one filament terminal grounded with the other filament terminal extending to a positive source of filament voltage 52 through a switch 53 and the suppressor grid of the tube is connected to the grounded filament terminal. The screen grid of the tube is connected through a resistor 54 to a positive battery terminal 56 and through a condenser 57 to ground. The anode circuit of tube 50 includes a tuned resonant circuit consisting of a choke 59 shunted by a condenser 60, this resonant circuit being connected between the anode of the tube and positive terminal 56. The resonant circuit is tuned to the frequency of the transmitter so that the transmitter output is selectively amplified.

The output of tube 50 is fed through a coupling condenser 61 to the control grid of an amplifier tube 62, said control grid being grounded through a resistor 63 and a bias battery 64. The suppressor grid of tube 62 is connected to the grounded filament terminal thereof and the filament, in turn, is connected between terminal 52 and ground. The screen grid of tube 62 is connected directly to terminal 56 while the anode is connected to this terminal through a load resistor 66. The signal output from the tube anode passes through a coupling condenser 67 to one terminal of a jack 68, the other terminal of which is grounded.

It will be apparent that the receiver of Figure 2 picks up the signals produced by the transmitter and selectively amplifies them, a set of earphones or other transducer being inserted into the jack 68 to receive the output of the receiver. Further, the receiver may be adjusted to high or low sensitivity by operation of switch 51.

As previously stated, the signal to input terminals 46, 47 is supplied by a probe which produces a voltage responsive to the presence of an electric field surrounding the cable to be tested. Where the faulted conductor is open circuited, a probe is used which detects the presence of an electrostatic field and such a probe may consist of a wire which is bent in the form of a hook so that it will easily follow the cable to be tested. Where it is desired to detect the presence of an electromagnetic field, it is preferred to use the improved probe disclosed by Figures 3 and 4.

This unit consists of a generally cylindrical casing 70 of non-magnetic material, such as aluminum, having a longitudinal slot 71 formed therein. A pair of spaced end caps define a closed chamber within the shielding plate, one end cap consisting of a disc 72 of insulating material and the other end cap consisting of a conducting member 73 having a frusto-conical portion protruding beyond the casing and having an axial passage 74 for receiving a connector plug 75. The ends of the casing are spun over the end caps 72 and 73 to form a rigid assembly and a suitable sealing material may be placed around the end caps to exclude moisture or other deleterious substances from the interior of the chamber. Mounted within the chamber is an inductor 76 which is carried by a bracket 77 suitably secured to the casing 70. A condenser 78 is also mounted within the chamber by a bracket 79 and the terminals of this condenser are connected in parallel with the inductor terminals by leads 80, 81. Lead 80 is grounded to the casing 70 by a wire 82 and lead 81 is connected to plug 75 by a wire 83. The constants of the inductor and condenser are such that the unit has a resonant frequency at about 1,000 cycles or such other audio frequency as may be produced by the transmitter.

The slotted casing surrounds the coil and functions as an electrostatic shield. It is slotted to prevent having a shorted turn inductor surrounding the probe. When the pickup or probe is placed adjacent the cable, presence of an electromagnetic field about the conductor produces a variable flux in the open end of the iron core within the coil 76 and thereby induces a corresponding electric current in the resonant circuit consisting of the coil and condenser. The described probe has been found to be very sensitive and to accurately detect the presence of very small electromagnetic fields about the cable.

Figure 3:
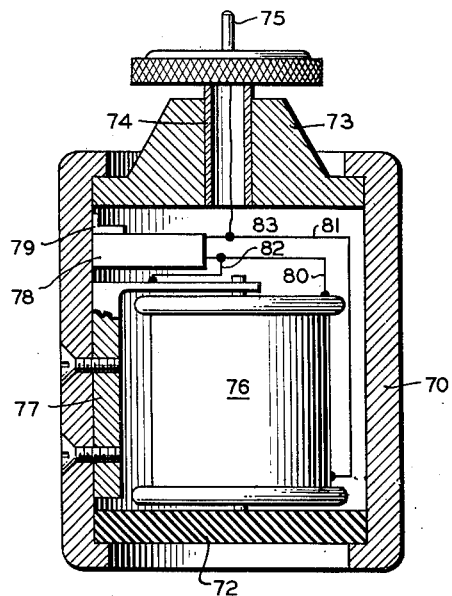
Figure 3 is a vertical sectional view, partially in elevation, of an improved inductive probe.
Figure 4:
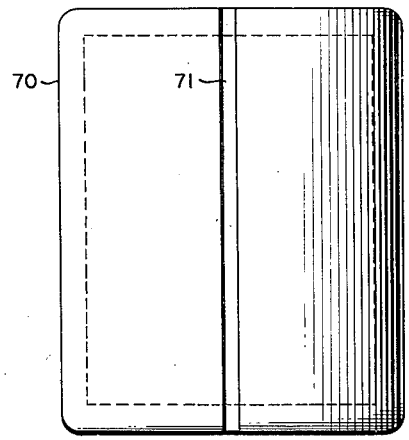
Figure 4 is a front elevational view of the probe casing.
Figure 5:
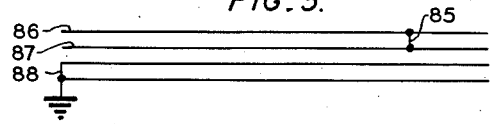
Figures 5 and 6 are diagrammatic views illustrating features of the invention.

In practicing the invention, a continuity tester is utilized to determine which conductor or conductors of the cable are faulted and whether the fault consists of a short or open circuit. If a short circuit is found to exist between two of the conductors in the cable, the output from terminals 36, 37 of the transmitter is applied to the short circuited conductors and switch 33 is thrown to its upper position to provide high current and low impedance output. In the example of Figure 5, a short circuit is indicated at 85 between conductors 86, 87 of the cable and the transmitter output is applied to the free end of said conductors 86 and 87. The rest of the conductors in the cable are grounded, as indicated at 88. Thereupon, the inductive probe of Figure 3 is connected to receiver input terminals 46, 47 and the receiver-probe unit is moved along within 5 feet of the cable. The transmitter provides a strong electromagnetic field about the cable between the fault and point of application of the transmitter current while, beyond the fault, there is a negligible field. Accordingly, the location of the fault is accurately determined by noting the position at which the receiver indicates an abrupt decrease in the electromagnetic field strength. It is desirable to adjust switch 51 so as to provide high receiver sensitivity until the approximate location of the fault is found and then to adjust the receiver to low sensitivity to find the precise location of the fault.

Figure 6:
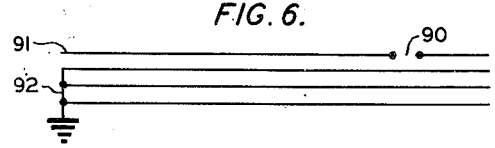

When it is determined that an open circuit exists in a conductor of the cable, all of the cable conductors, with the exception of the faulted one, are grounded and the transmitter voltage is applied between the faulted conductor and ground, the switch 33 being thrown to its lower position to provide a high voltage high impedance output circuit, and a capacitive coupling to the cable. In Figure 6, the open circuit is indicated at 90, conductor 91 is the faulted wire, and all of the remaining conductors are grounded at 92. The voltage from the transmitter is applied at either end of the cable between conductor 91 and ground. It will be apparent that a substantial electrostatic field will exist around the cable from the point of application of the voltage to the location of the open circuit while substantially no field will exist beyond the open circuit. The absence of any stray field in the conductor 91 beyond the open circuit fault 90 is made certain by grounding separately all of the other conductors 92 whereby they carry no current and are not in ground path of any current so they cannot act as floating plates to cause stray fields and erratic operation, which might be due to charges on wires 92 and such charges inducing a field in conductor 91 to the right of fault 90 as shown in Figure 6. The presence of this field is indicated by the capacitive probe previously mentioned which is connected to input terminal 46 of the receiver. In this case too, the probe-receiver unit is moved along the cable and the position of the fault located by noting the position at which there is a sharp decrease in the electrostatic field. The switch 51 of the receiver is adjusted to provide high sensitivity to determine approximate location of the fault and low sensitivity to determine the precise location of the circuit.

The present method has been found to provide highly accurate results in determining the location of the fault in the cable. The fact that it is possible to ground all cable conductors except those actually under test largely eliminates stray fields and permits very accurate readings to be obtained. The construction of the receiver, probe, and transmitter units is such that they are readily adapted to be manufactured in portable form. By using this apparatus, the exact position of the faulted conductor on the circumference of the cable is located before making an incision in the cable for purposes of repair or of making tap connections. The equipment may be readily manufactured from the standard circuit components and is extremely simple to adjust in actual field work.

With reference to Figure 7 there is illustrated a modified form of transmitter circuit which can be employed in place of the transmitter circuit illustrated in Figure 1. Pulses are generated in this circuit by an oscillator having a dual triode 100 including separate triodes 101 and 102. The anode of triode 101 is connected through a resistor 108 to power supply terminal 11', and to the control grid of triode 102 through series connected condenser 103 and resistor 104. The cathode of triode 101 is connected to ground through resistor 105, and the control grid of triode 101 is connected to ground through resistor 106, this latter resistor being shunted by a condenser 107. The anode of triode 102 is connected to power supply terminal 11' through resistor 110, and to the control grid of triode 101 through series connected resistor 111 and condenser 112. The cathode of triode 102 is connected to ground through resistor 113, and the control grid of triode 102 is connected to ground through a resistor 114.

The oscillator circuit thus far described operates such that triode sections 101 and 102 are conductive alternately, that is the flow of anode current through each triode section produces a voltage pulse which initiates operation of the other triode section after a preselected time delay. The frequency of oscillations is determined by the resistance-capacitance network which provides regenerative coupling between the output and input of the resulting feedback amplifier. This regenerative network consists of resistors 111, 106 and condensers 112, 107. It can be shown mathematically that oscillations tend to take place at a frequency defined by the following equation:

$$f = \frac{1}{2\pi\sqrt{R_{111}R_{106}C_{112}C_{107}}}$$

where $R_{111}$, $R_{106}$, $C_{112}$ and $C_{107}$ represent values of resistors 111, 106 and condensers 112, 107, respectiively. In one particular embodiment of this oscillator resistors 111 and 106 are each 120,000 ohms and condensers 112 and 107 are .001 microfarads. Substitution of these values in the above mentioned equation idicates that a frequency of approximately 1325 cycles per second is obtained.

The output of this oscillator circuit is amplified by a unit consisting of dual triode 118 containing triode sections 119 and 120. The common junction between condenser 103 and resistor 104 is connected to the control grid of triode 119 by means of conductor 121 and the anode of triode 102 is connected to the control grid of triode 120 through condenser 122, which control grid of triode 120 also is connected to ground through resistor 124. The anodes of triodes 119 and 120 are connected to opposite end terminals of the primary winding of an output transformer 127 by conductors 125 and 126, respectively, and a center tap of the primary winding of transformer 127 is connected directly to power supply terminal 11'. Since the oscillator circuit is such that triodes 101 and 102 conduct alternately, the output voltages on the anodes of these triodes are 180° out of phase with one another which is the required input relationship needed for push-pull amplification.

The secondary winding of transformer 127 is connected to one set of terminals of a double pole, double throw switch 33' and the other set of switch terminals is connected through condensers 129 and 130 to conductors 125 and 126, respectively. The blades of switch 33' are connected to output terminals 36' and 37', respectively, this latter terminal being provided with a ground connection.

While the invention has been described in connection with present, preferred embodiments thereof, it is to be understood that this description is illustrative only and is not intended to limit the invention.

Having described my invention, I claim:

A signal generator for prividing both high voltage and high current audio frequency signals for use in detecting faults in a multi-conductor cable comprising an audio frequency oscillator including a first tube having an anode, a cathode and a control grid, a second tube having an anode, a cathode and a control grid, a first capacitor connected between the control grid of said first tube and a point of reference potential, a first resistor connected in parallel with said first capacitor, a second resistor connected between the cathode of said first tube and said reference potential, a third resistor connected between the cathode of said second tube and said reference potential, a source of potential which is positive with respect to said reference potential, a fourth resistor connected between the anode of said first tube and said source of positive potential, a fifth resistor connected between the anode of said second tube and said source of positive potential, a sixth resistor connected between the control grid of said second tube and said reference potential, a second capacitor and a seventh resistor connected in series between the anode of said first tube and the control grid of said second tube, and an eighth resistor and a third capacitor connected in series between the anode of said second tube and the control grid of said first tube; an amplifier comprising third and fourth tubes each having an anode, a cathode and a control grid, means connecting the control grid of said third tube to the junction between said second capacitor and said seventh resistor, a fourth capacitor connected between the anode of said second tube and the control grid of said fourth tube, a ninth resistor connected between the control grid of said fourth tube and said reference potential, and a tenth resistor connected between said reference potential and the cathodes of said third and fourth tubes; a transformer; means connecting the end terminals of the primary winding of the transformer to the anodes of said third and fourth tubes, respectively; means connecting a center tap on the primary winding of said transformer to said source of positive potential; a fifth capacitor having one terminal connected to the anode of said third tube; a sixth capacitor having one terminal connected to the anode of said fourth tube; first and second output terminals connected to respective end terminals of the secondary winding of said transformer; third and fourth output terminals connected to corresponding second terminals of said fifth and sixth capacitors, respectively; first and second switches adapted to engage said first and second terminals, respectively, in a first position and to engage said third and fourth terminals, respectively, in a second position; a fifth output terminal connected to said first switch; and a sixth output terminal connected to said second switch.

References Cited in the file of this patent

UNITED STATES PATENTS

| | | |
|---|---|---|
| 1,954,305 | Williams | Apr. 10, 1934 |
| 1,983,665 | Hickok | Dec. 11, 1934 |
| 2,121,434 | Klinedinst et al. | June 21, 1938 |
| 2,338,512 | Harmon | Jan. 4, 1944 |
| 2,439,844 | Davis | Apr. 20, 1948 |
| 2,441,963 | Gray | May 25, 1948 |
| 2,471,417 | Dimmick et al. | May 31, 1949 |

OTHER REFERENCES

"Radio Engineering," By Terman, published by McGraw-Hill Book Co., 1937, pages 86, 87, 175, 176, 372, 373.